Oct. 4, 1932.          R. PORCELLO          1,881,295
PORTABLE ELECTRIC HAND SAW
Filed June 15, 1932
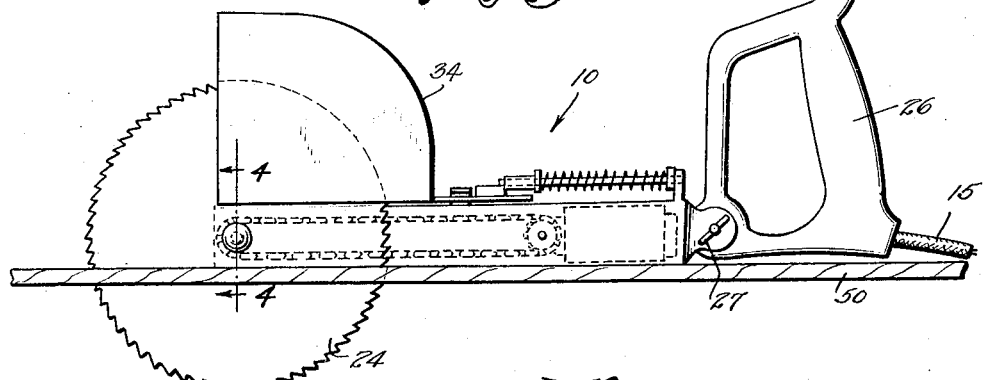
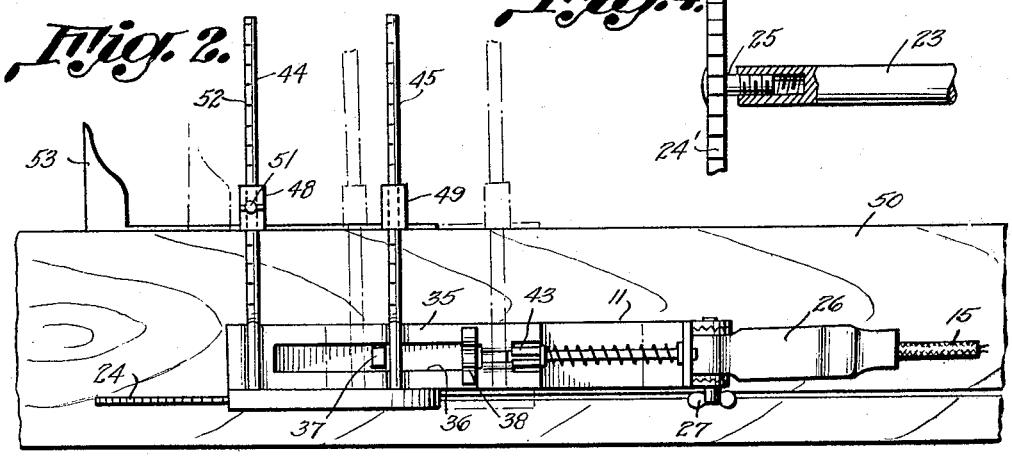
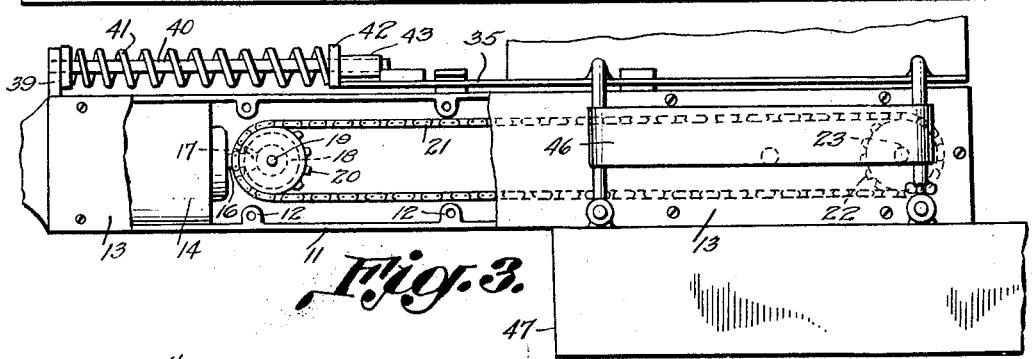
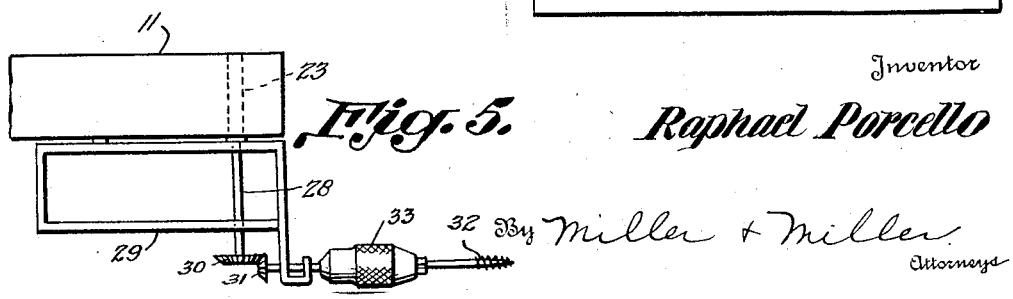
Inventor
Raphael Porcello
By Miller & Miller
Attorneys Patented Oct. 4, 1932

1,881,295

UNITED STATES PATENT OFFICE

RAPHAEL PORCELLO, OF RICHMOND HILL, NEW YORK

PORTABLE ELECTRIC HAND SAW

Application filed June 15, 1932. Serial No. 617,440.

This invention relates to a portable electric saw and has for an object to provide an improved portable electric saw and electric saw operating means which may be used for operating a plurality of other tools.

Yet a further object of this invention is to provide an improved electric saw having graduated guiding means whereby the saw may be used to saw a board of any predetermined width, and which guiding means will serve to guide the cut even though there is an obstruction preventing the guide from reaching the end of the board.

Yet an additional object of this invention is to provide an operating means from which the saw blade may be removed and other types of rotatable wheel tools may be substituted, such as a still brush for removing paint, buffing or polishing brushes, a crack plaster opener, etc.

Yet an additional object of this invention is to provide a graduated cutting guide which is yieldable to permit the saw blade to advance beyond the cutting guide when the guide is obstructed, without however losing the benefit of being guided thereby.

Still a further object of this invention is to provide an operating means from which the saw guard and the saw guide may be removed therefrom to permit other types of tools to be attached thereto to be electrically operated thereby, such as a drill, screw driver, or other suitable tool.

With the foregoing and other objects in view, as will hereinafter become apparent, this invention comprises the constructions, combinations and arrangements of parts, hereinafter set forth, disclosed and shown on the accompanying drawing. In this drawing, Figure 1 is a front elevation of the saw, Figure 2 is a top plan view of same showing position of guide member and gauge, Figure 3 is an enlarged rear view of the saw showing driving mechanism, Figure 4 is a sectional view taken on line 4—4 of Figure 1, and Figure 5 is a modification showing saw and cover removed and a drill placed on opposite side fastening to plate.

The portable electric hand saw 10 constituting this invention has a body or chassis 11 having a plurality of threaded eyelets 12 for receiving a cover plate 13. Enclosed within one end of the chassis 11 is an electric motor 14 controlled by a suitable switch through the electrical conduit 15. A shaft 16 from the motor 14 has a bevelled gear 17 thereon cooperating with a bevelled gear 18 on a shaft 19 on which is mounted a sprocket gear 20. The sprocket gear 20 operates a sprocket chain 21 to transmit the power to a sprocket gear 22 mounted in the other end of the chassis 11.

The sprocket gear 22 is mounted on and operates an internally threaded shaft 23, journaled in and projecting through each side of the chassis 11, the cover plate 13 having a suitable opening therethrough in alignment with the shaft 23. The saw blade 24 has a threaded shaft 25 projecting therefrom centrally thereof, which threaded shaft 25 may be screwed into the internally threaded shaft 23, as clearly shown in Figure 4, so that the saw blade 24 will partake of the revolution of the shaft 23. Although a saw blade 24 has been shown as being securable to the shaft 23, there has been shown at 24', in Figure 4, a diagrammatic fragmentary view of any suitable rotatable wheel latch tool which may be substituted for the saw blade, the element at 24' representing a brush, wheel, buffing tool, or any other similar rotatable tool.

A handle 26 is adjustably secured by means of the wing bolt and nut 27 to the chassis 11 for convenient operating purposes. It will be understood that the shaft 23 is internally threaded at each end thereof, and, as shown in Figure 5, a shaft 28 journaled in a framework 29 may be threaded into the opposite side of the shaft 23 for operating two bevelled gears 30 and 31, a drill or other tool 32 held in the chassis 33.

When the saw blade 24 is mounted for use, a detachable guard and guide is mounted thereon. The saw guard 34 is shaped to fit over the top of the saw blade 24 and protect the operator against accidentally touching the rotating blade. The guard 34 is pivotally mounted on a flange 35 projecting at right angles therefrom. The flange 35 is slotted as at 36 and this slot 36 has a pair of guiding knobs 37 and 38 projecting therethrough from the chassis 11 to hold the flange 35 in position for sliding movement on top of the chassis 11. A projection 39 on the chassis 11 has mounted thereon a guide shaft 40, about which is coiled a compression spring 41. The other end of the guide shaft 40 passes through a similar projection 42 and sleeve 43 on the flange 35.

Secured to the guiding flange 35 are a pair of lateral graduated rods 44 and 45. The rods 44 and 45 are bent over the sides of the chassis 11 and have a base 46 therebetween. These rods are then bent again at right angles so as to project outwardly from the saw 10 and in the same plane with the bottom thereof.

A guide 47 mounted on a pair of sleeves 48 and 49 cooperates with the edge of the board 50 being sawed, the sleeves 48 and 49 being each mounted respectively on the graduated rods 44 and 45, a set screw 51 being provided in one of the sleeves 48 so that the guide 47 may be set at any desired distance from the saw blade 24. The graduations 52 may be in any desired scale and will measure the distance between the setting of the guides 47 and the cutting of the saw blade 24, thus measuring the width of the board 50 that is being sawed thereby.

When in the process of using the saw 10 in close quarters as in a corner, and there is not room for the guide to go to the end of the board, the finger 53 striking the obstruction causes the entire guide mechanism to be held stationary while the saw blade 24 itself advances, the guiding flange 35 being guided by the slot 36 against the coil springs 41 on the shaft 40, which yield to hold it in position.

As will be obvious from the above description the entire guide and guiding mechanism is easily and quickly detachable and will be omitted from the mechanism when the drill 32 is being used thereon as in Figure 5.

The novel features and the operation of this device will be apparent from the foregoing description. While the device has been shown and the structure described in detail, it is obvious that this is not to be considered limited to the exact form disclosed, and that changes may be made therein within the scope of what is claimed, without departing from the spirit of the invention.

Having thus set forth and disclosed the nature of this invention, what is claimed is:

1. A portable electric handsaw comprising a chassis, a handle adjustably secured to one end of said chassis above the plane of the bottom of said chasis, an electric motor within said chassis, a rotatable shaft at the other end of said chassis, means connecting said rotatable shaft for operation by said electric motor, a circular saw on said shaft, lateral guide means projecting from said chassis for directing the operation of said saw and providing an abutting end, and means yieldably and detachably securing said guide means to said chassis permitting said saw to operate beyond said guide means.

2. A portable electric hand saw comprising a chassis, a handle adjustably secured to one end of said chasis above the plane of the bottom of said chassis, an electric motor within said chassis, a rotatable shaft at the other end of said chassis, means connecting said rotatable shaft for operation by said electric motor, a circular saw on said shaft, a combination saw guard and lateral guide means projecting from said chassis for directing the operation of said saw and protecting the operator and providing an abutting end, and means yieldably and detachably securing said combination saw guard and guide means to said chassis permitting said saw blade to operate in advance of said guide means.

3. A portable electric handsaw comprising a chassis, a handle adjustably secured to one end of said chassis above the plane of the bottom of said chassis, an electric motor within said chassis, a rotatable shaft at the other end of said chassis, means connecting said rotatable shaft for operation by said electric motor, a circular saw on said shaft, a combination saw guard and lateral guide means projecting from said chassis for directing the operation of said saw and protecting the operator and providing an abutting end, said combination saw guard and lateral guide means comprising a shield over the top of said circular saw, a slotted flange at right angles to said shield, means on said chassis cooperating with said slotted flange to hold it yieldably in position, a pair of lateral rods projecting from said flange in the plane of the bottom of said chassis, and an adjustable guide plate securable along said rods therebelow.

4. A portable electric hand saw comprising a chassis, a handle adjustably secured to one end of said chassis above the plane of the bottom of said chassis, an electric motor within said chassis, a rotatable shaft at the other end of said chassis, means connecting said rotatable shaft for operation by said electric motor, a circular saw on said shaft a combination saw guard and lateral guide means projecting from said chassis for directing the operation of said saw and protecting the operator and providing an abutting end, said combination saw guard and lateral guide means comprising a shield over the top of said circular saw, a slotted flange at right angles to said shield, means on said chassis cooperating with said slotted flange to hold it yieldably in positon, a pair of lateral rods projectng from said flange in the plane of the bottom of said chassis, an adjustable guide plate securable along said rods therebelow, said yieldable means comprising a guide shaft secured to said chassis, a compression spring coiled about said guide shaft, and a sleeve on said guide shaft pressing against said compression spring.

In testimony whereof I affix my signature.

RAPHAEL PORCELLO.